US012794501B2

(12) United States Patent
Schmid et al.

(10) Patent No.: US 12,794,501 B2
(45) Date of Patent: Nov. 10, 2026

(54) ERROR VECTOR MAGNITUDE-BASED SUPPRESSION OF DISCRETE INTERFERERS

(71) Applicant: Outdoor Wireless Networks LLC, Richardson, TX (US)

(72) Inventors: Peter Schmid, Marxheim-Neuhausen (DE); Thomas Rauwolf, Minderoffingen (DE)

(73) Assignee: Outdoor Wireless Networks LLC, Richardson, TX (US)

( * ) Notice: Subject to any disclaimer, the term of this patent is extended or adjusted under 35 U.S.C. 154(b) by 24 days.

(21) Appl. No.: 19/089,549

(22) Filed: Mar. 25, 2025

(65) Prior Publication Data

US 2025/0317161 A1 Oct. 9, 2025

Related U.S. Application Data

(60) Provisional application No. 63/573,867, filed on Apr. 3, 2024.

(51) Int. Cl.
*H04B 1/12* (2006.01)

(52) U.S. Cl.
CPC ...................................... *H04B 1/12* (2013.01)

(58) Field of Classification Search
CPC ........................................................ H04B 1/12
USPC ........................................................... 375/346
See application file for complete search history.

(56) References Cited

U.S. PATENT DOCUMENTS

2009/0180521 A1* 7/2009 Joseph .................. H04L 5/0007
375/346

* cited by examiner

*Primary Examiner* — Fitwi Y Hailegiorgis
(74) *Attorney, Agent, or Firm* — Fogg & Powers LLC

(57) ABSTRACT

Systems and methods for error vector magnitude (EVM) based suppression of discrete interferers are described herein. In certain embodiments, a system includes a control unit that receives a signal having a plurality of subcarriers, wherein the signal has a wanted portion affected by one or more discrete interferers. Further, the control unit calculates EVM measurements for multiple subcarriers in the plurality of subcarriers. Also, the control unit identifies one or more sets of proximate subcarriers affected by EVM impairments. Moreover, the control unit calculates a frequency and a magnitude for a discrete interferer for each of the sets of proximate subcarriers based on one or more EVM measurements for each of the sets of proximate subcarriers. Additionally, for each calculated frequency and magnitude, the control unit generates a control signal that can be used to reduce effects of the discrete interferer associated with the calculated frequency and magnitude.

20 Claims, 7 Drawing Sheets

ERROR VECTOR MAGNITUDE-BASED SUPPRESSION OF DISCRETE INTERFERERS

CROSS-REFERENCE TO RELATED APPLICATIONS

This application claims the benefit of U.S. Provisional Application Ser. No. 63/573,867, filed Apr. 3, 2024, and titled "ERROR VECTOR MAGNITUDE-BASED SUPPRESSION OF DISCRETE INTERFERERS," which is hereby incorporated herein by reference.

BACKGROUND

Many communication systems use digital signal processing to transport signals between different communications nodes. Discrete spurious interferers often arise within the pass band containing the digitized information when processing and transporting digital signals. The discrete interferers can have relatively high levels compared to the signal having the digitized information. In some communication systems that use subcarriers to transmit information, such as CP-OFDM, the amplitude of the discrete interferers can be even larger when compared to the desired signal.

SUMMARY

Systems and methods for error vector magnitude (EVM) based suppression of discrete interferers are described herein. In certain embodiments, a system includes a control unit configured to receive a signal having a plurality of subcarriers, wherein the signal has a wanted portion affected by one or more discrete interferers. Further, the control unit is configured to calculate error vector magnitude (EVM) measurements for multiple subcarriers in the plurality of subcarriers. Also, the control unit is configured to identify one or more sets of proximate subcarriers affected by EVM impairments. Moreover, the control unit is configured to calculate a frequency and a magnitude for a discrete interferer for each of the one or more sets of proximate subcarriers based on one or more EVM measurements for each of the one or more sets of proximate subcarriers. Additionally, for each calculated frequency and each magnitude, the control unit is configured to generate a control signal that can be used to reduce effects of the discrete interferer associated with the calculated frequency and the calculated magnitude.

BRIEF DESCRIPTION OF THE DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

Systems and methods for error vector magnitude (EVM) based suppression of discrete interferers are described herein. When a communication system performs digital processing, discrete interferers can inadvertently arise, degrading the desired signal's integrity and performance. These unintentional interferers manifest as distortion that can significantly impact system performance, particularly systems that employ particular coding schemes. In certain embodiments, a system can address the discrete interferer by measuring the EVM for a wanted modulated signal and then identifying the frequency and magnitude of the discrete interferer from the EVM measurements. After calculating the frequency and magnitude from the EVM measurement, the system can generate a continuous wave signal at the calculated frequency and magnitude that can be added to the original signal to mitigate the effects of the discrete interferer in the presence of a wanted modulated signal.

Figure 1:
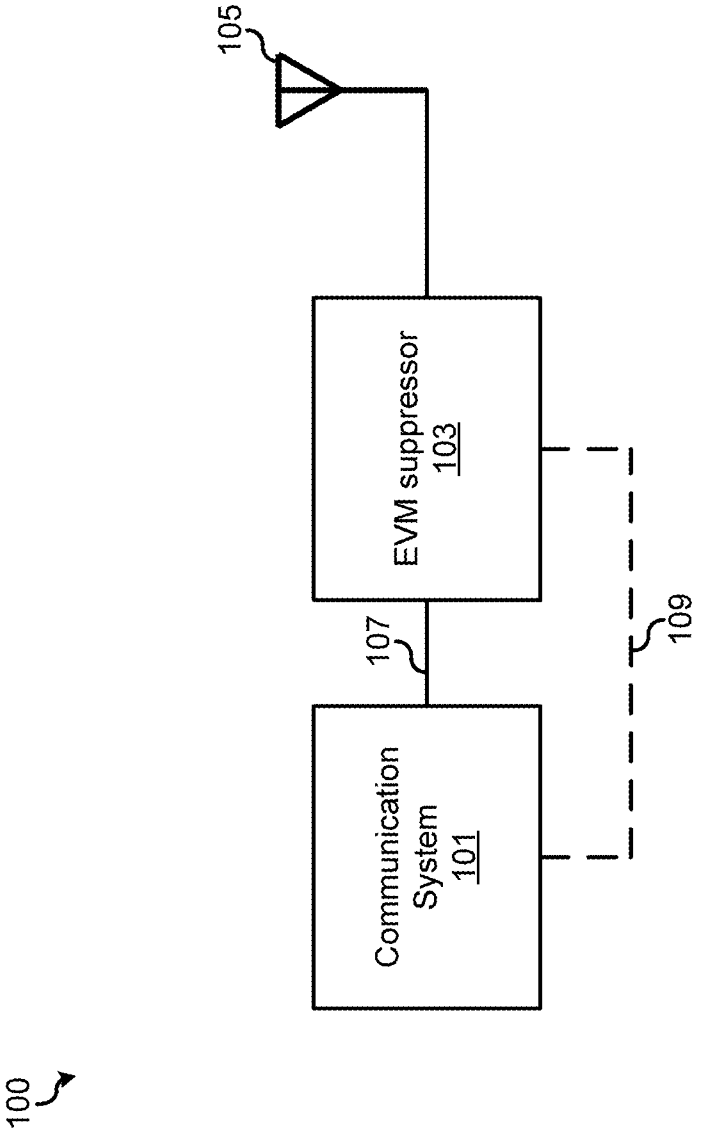
FIG. 1 is a block diagram of a system implementing error vector magnitude (EVM) based suppression of discrete interferers according to an aspect of the present disclosure.

FIG. 1 is a system 100 for implementing EVM-based suppression. As shown, the system 100 includes a communication system 101 and an EVM suppressor 103. The communication system 101 may perform digital processing and provide digital or analog signals to other systems. For example, the communication system 101 may provide digital or analog signals to other systems through wireless or wired communication. For example, as illustrated in the system 100, the communication system 101 transmits a signal for wireless transmission to another system through the antenna 105. In particular, the communication system 101 may transmit a signal to user equipment through the antenna 105.

In certain embodiments, when the communication system 101 performs the digital processing, discrete interferers can inadvertently arise, degrading the integrity and performance of the desired signal. As described herein, discrete interferers are unwanted signal components with distinct, identifiable frequencies. These discrete interferers are often a byproduct of several factors, including but not limited to clocks and associated harmonics, local oscillators, and mixing products. Furthermore, implementing digital signal processing algorithms can introduce artifacts or harmonics due to finite precision arithmetic, generating spurious signals at frequencies that interfere with the desired communication signal. These unintentional interferers manifest as distortion that can significantly impact system performance.

In additional embodiments, the negative impacts of discrete interferers may depend on the communication scheme used to convey information. For example, in systems that employ orthogonal frequency division multiplexing (OFDM), which is used in systems like 5G, LTE, and Wi-Fi, discrete interferers can be particularly significant due to the characteristics of the OFDM. In particular, OFDM transmits data over many closely spaced orthogonal sub-carriers. Discrete interferers can cause inter-carrier interference when overlapping with the OFDM sub-carriers. Inter-carrier interference can degrade the signal-to-interference-noise ratio (SINR) of the affected sub-carriers. Additionally, the increase in SINR caused by the discrete interferers can increase the symbol error rate. Increasing SINR and symbol error rates can reduce system capacity.

To address the discrete interferers in the system 100, the output of the communication system 101 may provide an output 107 having discrete interferers to an EVM suppressor 103. The EVM suppressor receives the output 107 and measures the EVM to mitigate the effects of the discrete interferer. Measuring the EVM enables the suppression of the discrete interferers in the presence of a wanted modulated signal. While the EVM suppressor 103 is shown as separate from the communication system 101, the EVM suppressor 103 may be performed by processors and circuitry that are part of the communication system 101.

As used herein, EVM refers to a metric used in the field of telecommunications to quantify the performance of a digital communication system. In particular, EVM measures the difference between the actual transmitted symbol and the ideal symbol intended to be transmitted. This difference is represented as a vector in the signal's constellation diagram, which graphically shows the possible symbol points. EVM is often expressed as a percentage, indicating the magnitude of the error vector relative to the ideal symbol's magnitude or in decibels (dB) to denote the power ratio of the error signal to the reference signal. A lower EVM value signifies a closer approximation to the ideal signal, implying higher signal integrity and system performance. EVM takes into account various impairments affecting signal quality, including carrier leakage, phase noise, amplitude imbalance, and quadrature skew, making it a comprehensive indicator of the system's ability to transmit and receive digital modulations with minimal distortions.

To perform EVM measurements, the system 100 may acquire information from a different system that sends signals to the system 100, enabling the system 100 to identify symbols received by the system 100. For example, the system 100 may receive signals that allow the system 100 to perform time and/or frequency synchronization with the different system. For example, the system 100 may be a distributed antenna system (DAS) in communication with a base transceiver station (BTS). The DAS may include a master unit that receives synchronization signals from the BTS, and the DAS synchronizes operations with the BTS using the received synchronization signals. Also, the system 100 may evaluate control and signaling information like modulation and coding schemes, resource allocations, and the like that allow the system 100 to identify the expected symbols. For example, a BTS may send modulation and coding scheme information and resource allocation information to the master unit in the DAS. When the communication system 101 has synchronized communications and received the modulation and coding scheme information, the system 100 may perform the EVM measurements. In embodiments such as CP-OFDM, the system 100 may measure the EVM for each subcarrier in the frequency domain.

In certain embodiments, the communication system 101 measures the EVM for each subcarrier and then provides the EVM measurements to the EVM suppressor 103 through the output 107. Alternatively, the communication system 101 may provide the signals to the EVM suppressor 103 through the output 107, where the EVM suppressor 103 measures the EVM for the signals. Further, in providing the signals to the EVM suppressor 103, the communication system 101 may provide digital signals as part of the output 107. Alternatively, the communication system 101 may provide analog signals as part of the output 107 to the EVM suppressor 103. When the communication system 101 provides analog signals to the EVM suppressor 103, the EVM suppressor 103 may include an analog-to-digital converter (ADC) to convert the analog signals into the digital domain for EVM suppression. In an additional alternative, an ADC may be placed between the communication system 101 and the EVM suppressor 103.

In some embodiments, with the digital signals and the EVM measurements, the EVM suppressor 103 can suppress discrete interferers in the presence of a wanted signal. For example, when the received signals have multiple subcarriers, the EVM suppressor 103 may identify the subcarriers affected by EVM impairments. Using the identified subcarriers, the EVM suppressor 103 may identify the frequency of a discrete interferer impairing wanted signals at the subcarriers. Additionally, the EVM suppressor 103 may calculate the magnitude of the discrete interferer from the EVM of the identified subcarriers. When the EVM suppressor 103 has identified the frequency and magnitude of the discrete interferer, the EVM suppressor 103 generates a signal to suppress the discrete interferer. Further, the EVM suppressor 103 may phase shift the generated signal until the EVM of the subcarriers is below a defined limit or is minimized.

In certain embodiments, when the EVM suppressor 103 generates the signal, the EVM suppressor 103 may generate a continuous wave (CW) signal. In some implementations, the EVM suppressor 103 may provide the generated signal to the communication system 101 through a feedback loop 109, where the communication system 101 then superposes the generated signal over the received signal to be communicated. Alternatively, the EVM suppressor 103 may superpose the generated signal directly. After suppressing the discrete interferers, the signal may be transmitted to other systems wirelessly (i.e., through an antenna 105) or through a wired connection.

Figure 2:
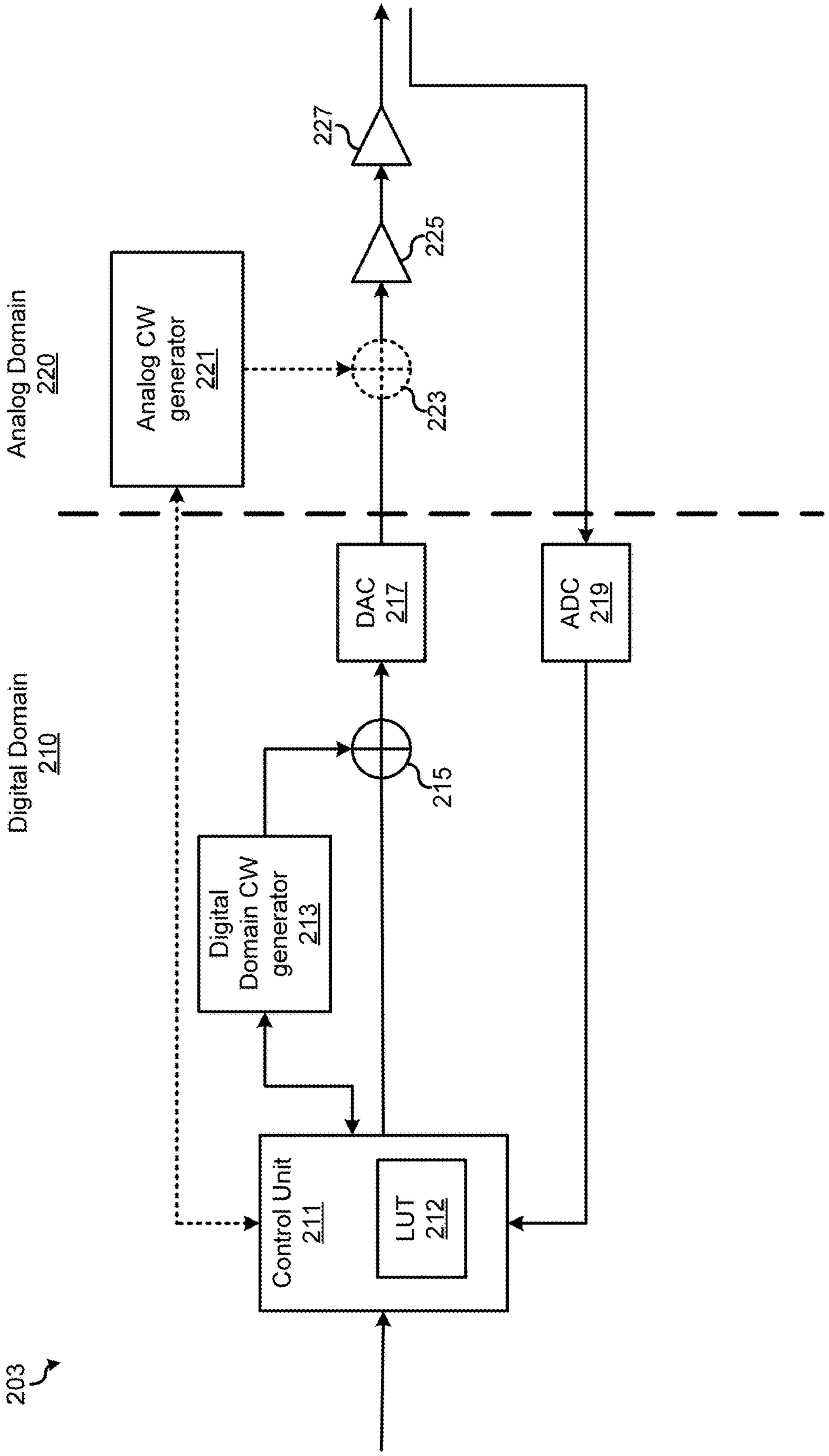
FIG. 2 is a block diagram of a system for performing EVM-based suppression of discrete interferers according to an aspect of the present disclosure.

FIG. 2 is a block diagram of an exemplary embodiment of an EVM suppressor 203 that performs the abovementioned functionality for the EVM suppressor 103. In some embodiments, a portion of the EVM suppressor 203 is performed by the communication system 101. As illustrated, the EVM suppressor 203 may include a digital domain 210 and an analog domain 220. Within the digital domain 210, the EVM suppressor 203 analyzes the communication signal. In some implementations, the EVM suppressor 203 generates a superposition signal and superposes the generated signals over the communication signal within the digital domain 210. In other implementations, after the digital domain 210 analyzes the communication signal, the EVM suppressor 203 generates an analog signal superposed with the communication signal within the analog domain 220.

In certain embodiments, the EVM suppressor 203 includes a control unit 211. The control unit 211 may include processing and circuitry configured to receive digital signals and decouple the received digital signals for EVM analysis. In some implementations, when the control unit 211 receives an analog signal, the control unit 211 may decouple the analog signal and convert the analog signal into the digital domain for analysis. After decoupling, the control unit 211 performs EVM measurements for each subcarrier of the CP-OFDM carrier in the decoupled digital signal.

In some embodiments, after calculating the EVM measurements for the subcarriers, the control unit 211 analyzes the EVM measurements for the subcarriers to identify the frequency and magnitude of potential discrete interferers associated with the EVM measurements. For example, the control unit 211 may identify sets of neighboring subcarriers with EVM measurements greater than a threshold. When the control unit 211 identifies a set of neighboring subcarriers, the control unit 211 then calculates a frequency of a discrete interferer associated with the EVM measurements for the set of neighboring subcarriers. Additionally, the control unit 211 may then calculate the magnitude for the discrete interferer using the EVM measurements for the set of neighboring subcarriers.

In exemplary embodiments, when the EVM impairment is associated with only a single subcarrier, the associated discrete interferer is positioned at the frequency of the subcarrier. In some techniques, like CP-OFDM, the subcarriers are orthogonal to one another. Thus, a discrete interferer beating accurately a single subcarrier only affects this single subcarrier because of the orthogonality. Thus, the control unit 211 identifies the frequency of the discrete interferer as the same frequency of the affected subcarrier.

In other embodiments, when the EVM measurement is associated with multiple subcarriers, the control unit 211 may use the EVM measurements for the affected subcarriers to identify the frequency of the discrete interferer. For example, if a frequency for a discrete interferer differs from the frequency of a subcarrier, the frequency of the discrete interferer is between the frequency of two subcarriers. When the frequency of the discrete interferer is between the frequency of two subcarriers, the two adjacent subcarriers are impaired most, but additional subcarriers are also impaired.

When calculating the frequency of the discrete interferer from multiple EVM measurements, the control unit 211 may model the effect of a discrete interferer on the EVM of a subcarrier using a sinc function. In particular, if the discrete interferer is superposing exactly on a subcarrier then the EVM of the discrete interferer would be equal to $EVM_0$. If the frequency of the discrete interferer is offset a certain frequency from a subcarrier frequency, then the resultant EVM on the subcarrier would be equal to:

$$EVM = EVM_0 \cdot \mathrm{sinc}\left[\pi \cdot f_{offset}/SCS\right],$$

where the SCS is the spacing of the subcarriers, and the $f_{offset}$ is the offset frequency of the discrete interferer from the subcarrier. However, the frequency of the discrete interferer is generally unknown.

In further embodiments, the control unit 211 identifies the frequency of the discrete interferer by generating ratios of EVM measurements from multiple proximate subcarriers. As mentioned above, a discrete interferer likely has the greatest effect on the two subcarriers that immediately neighbor the discrete interferer. The control unit 211 knows the exact location of the subcarriers based on the acquired frequency synchronization and control information (including the modulation and coding scheme information). When generating the ratios, the control unit 211 does not need to know the $EVM_0$ for the discrete interferers. In particular, the control unit 211 can use an $EVM_{lower}$ from the subcarrier having the lower frequency and the $EVM_{upper}$ from the subcarrier having the higher frequency, which are related to the $EVM_0$ of the discrete interferer by the following equations:

$$EVM_{lower} = EVM_0 \cdot \mathrm{sinc}\left[\pi \cdot f_{offset}/SCS\right], \text{ and}$$

$$EVM_{upper} = EVM_0 \cdot \mathrm{sinc}\left[\pi \cdot (f_{offset} - SCS)/SCS\right]$$

Using the ratio of the $EVM_{lower}$ to the $EVM_{upper}$ removes the $EVM_0$ and results in the following equation:

$$\frac{EVM_{lower}}{EVM_{upper}} = \frac{\sin\left[\pi \cdot f_{offset}/SCS\right] \cdot (f_{offset} - SCS)}{\sin\left[\pi \cdot (f_{offset} - SCS)/SCS\right] \cdot f_{offset}}$$

Thus, as the control unit 211 can measure both the $EVM_{lower}$ and the $EVM_{upper}$ the control unit 211 can calculate the exact frequency of the discrete interferer. Also, the ratio may be calculated by dividing the $EVM_{upper}$ by the $EVM_{lower}$.

In some embodiments, it may be difficult for the control unit 211 to calculate the $f_{offset}$ directly from the ratio of the $EVM_{power}$ to the $EVM_{upper}$. As such, the control unit 211 may identify the ratio of the $EVM_{lower}$ to the $EVM_{upper}$ and instead of performing the complex calculations using numerical methods to find the $f_{offset}$, the control unit 211 may include a look-up table (LUT) 212 that stores offset frequency values for various ratios of the $EVM_{lower}$ to the $EVM_{upper}$. Accordingly, the control unit 211 calculates the EVM measurements for subcarriers adjacent to a discrete interferer. Then, the control unit 211 calculates the ratio of the two measurements and then searches the LUT 212 to identify the associated frequency offset in relation to the subcarrier frequencies.

In additional embodiments, the control unit 211 may also calculate the magnitude of the discrete interferer. The control unit 211 can calculate the magnitude of the discrete interferer from the EVM of the affected subcarriers. For example, the control unit 211 may identify a set of neighboring subcarriers affected by EVM measurements above a certain level. EVM measurements may be above a certain level if they exceed a predefined threshold or if the EVM measurements are above a percentage of the highest EVM measurement within a group of subcarriers with sufficient EVM measurements. When the set of neighboring subcarriers has been identified, the control unit 211 will use the EVM measurements for the identified set of neighboring subcarriers to calculate the magnitude of the discrete interferer using quadratic addition with subsequent root formation. For example, when the control unit 211 identifies four subcarriers having sufficient EVM measurements, the control unit 211 may calculate the EVM magnitude for the discrete interferer using the following equation:

$$EVM_{overall} = \sqrt{EVM_{SC1}^2 + EVM_{SC2}^2 + EVM_{SC3}^2 + EVM_{SC4}^2}.$$

As shown, the $EVM_{SC1}$, $EVM_{SC2}$, $EVM_{SC3}$, and $EVM_{SC4}$ represent the EVM measurements for four different subcarriers and the $EVM_{overall}$ represents the EVM measurement of the discrete interferer beating accurately a subcarrier. Additionally, using the $EVM_{overall}$, the control unity 211 may determine the magnitude of the amplitude of the discrete interferer. In particular, the control unit 211 may use the control and signaling information to identify the subcarrier power of the desired signal. Multiplying the magnitude of the amplitude of the subcarrier (extracted from the subcarrier power) by the $EVM_{overall}$ may yield the amplitude of the discrete interferer.

In certain embodiments, when the control unit 211 calculates the frequency and magnitude of the decoupled communication signal, the control unit 211 may provide a control signal to a digital domain CW generator 213. When the digital domain CW generator 213 receives the control signal from the control unit 211, the digital domain CW generator 213 generates a continuous wave signal at the frequency and magnitude of the discrete interferer. The digital domain CW generator 213 may provide the generated CW signal to a summer 215. The summer 215 then adds the generated CW signal to the communication signal to reduce the effects of the discrete interferer on the communication signals. The summer 215 provides the modified communication signal to a DAC 217 for conversion to the analog domain and then to amplifiers 225 and 227, which amplify the signal for transmission to other systems and/or devices.

In alternative embodiments, the control unit 211 may provide the control signals to an analog CW generator 221 in the analog domain. The analog CW generator 221 may receive a digital signal and generate an analog CW signal at the frequency and magnitude of the discrete interferer. The analog CW generator 221 may provide the generated analog CW signal to a summer 223. The summer 223 then adds the generated CW signal to the communication signal to reduce the effects of the discrete interferer on the communication signals. The summer 223 is then coupled to amplifiers 225 and 227, which amplify the signal for transmission to other systems and/or devices.

In some embodiments, a portion of the amplified signal is coupled back to the control unit 211 through an ADC 219 for further analysis by the control unit 211. For example, the control unit 211 may also measure the EVM of the amplified signals. While the control unit 211 measures the EVM of the amplified signals, the control unit 211 will control the phase of the generated CW signal, generated either by the digital domain generator 213 or the analog domain generator 221, via a control signal. The control unit 211 will change the phase to identify the phase of the generated CW signal that results in the smallest EVM measurement.

The methods described herein may be implemented or controlled by computer-executable instructions, such as program modules or components. For example, a processor(s) or computing device could perform the functions of control unit 211. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein may be implemented in software, firmware, or other computer-readable instructions. These instructions are typically stored on appropriate computer program products that include computer-readable media used to store computer-readable instructions or data structures. The computer-readable media may store computer-readable instructions or data structures, like the LUT 212. Such a computer-readable medium may be available media that can be accessed by a general-purpose or special-purpose computer or processor, or any programmable logic device.

Suitable computer-readable storage media may include, for example, non-volatile memory devices, including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can carry or store desired program code as computer-executable instructions or data structures.

Figure 3A:
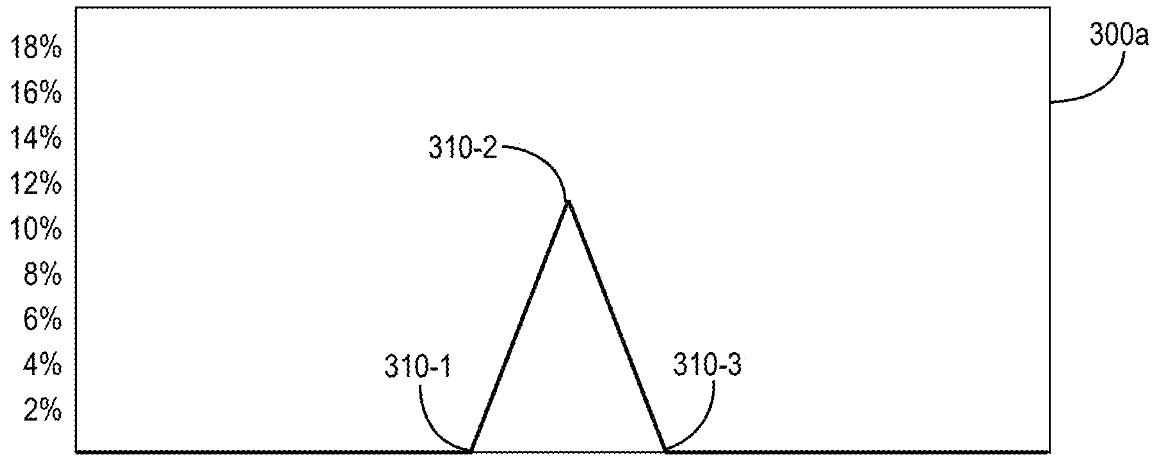
FIGS. 3A-3C are graphs illustrating EVM measurements for different positions of a discrete interferer according to an aspect of the present disclosure.
Figure 3B:
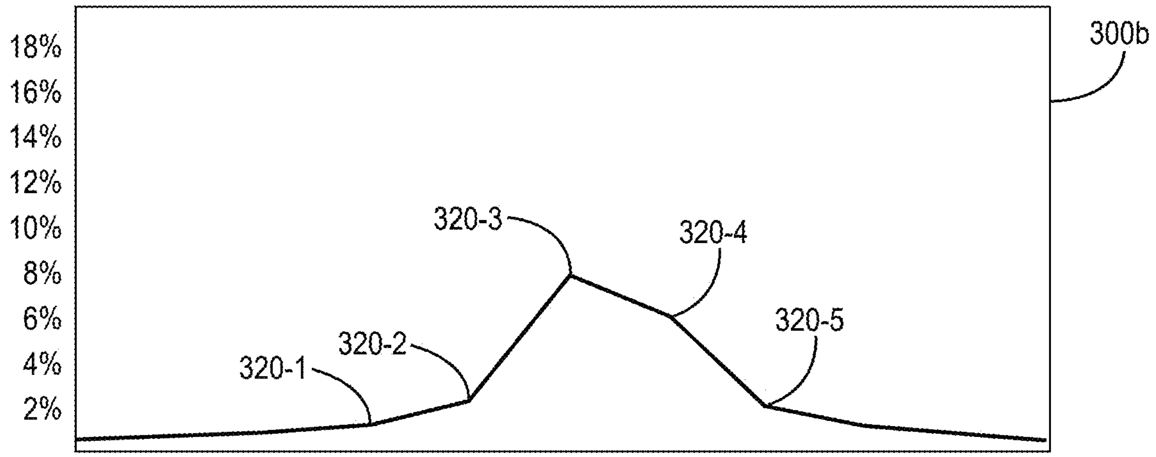
Figure 3C:
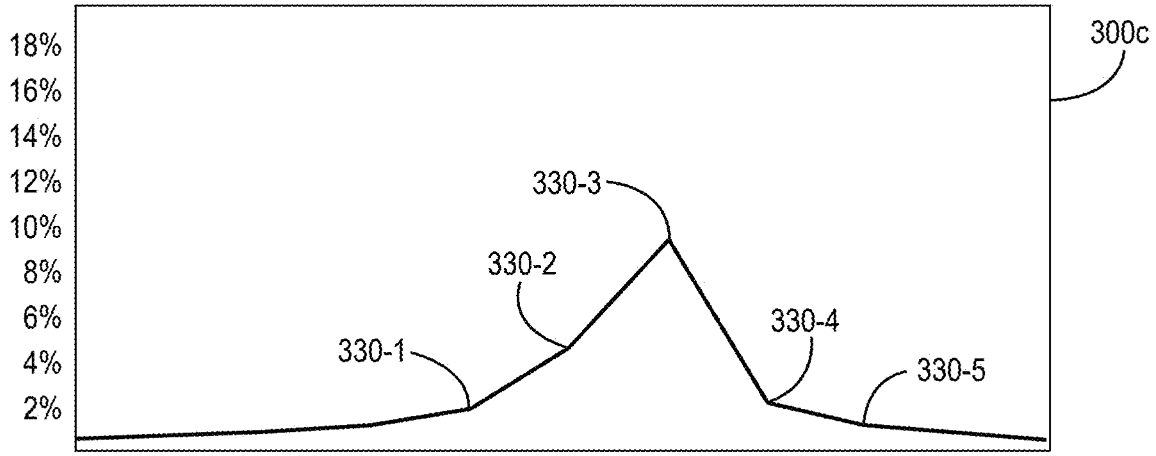

FIGS. 3A-3C illustrates graphs showing EVM measurements of subcarriers of a CP-OFDM signal at different frequencies of a discrete interferer. FIG. 3A illustrates a graph 300*a*, where only a single subcarrier is affected by a discrete interferer. In particular, the graph 300*a* shows EVM measurements for at least three neighboring subcarriers 310-1, 310-2, and 310-3. As shown, the EVM measurements for subcarriers 310-1 and 310-3 are close to, if not 0%, while the EVM measurement for the subcarrier 310-2 is about 11%. As the center subcarrier 310-2 is bordered by subcarriers 310-1 and 310-3, whose EVM is not affected, a control unit 211 may determine that the subcarrier 310-2 is affected by a discrete interferer at the frequency of the subcarrier 310-2 because of the orthogonality of the subcarriers. Further, the control unit 211 may determine that the discrete interferer has a magnitude proportional to the measured EVM for the subcarrier 310-2 and the level of the subcarrier 310-2.

In contrast, FIGS. 3B and 3C illustrate the effects of discrete interferers when the discrete interferer is at a frequency between subcarriers. For example, FIG. 3B illustrates a graph 300*b*, where multiple subcarriers are affected by a discrete interferer. In particular, the graph 300*b* shows EVM measurements for the group of subcarriers 320-1-320-5. As shown, each subcarrier 320-1-320-5 has a non-zero EVM measurement. For example, the control unit 211 may identify the EVM measurements that exceed a threshold value. Alternatively, the control unit 211 may identify the largest N EVM measurements. In some implementations, the control unit 211 may identify the four largest EVM measurements. As such, the control unit 211 may identify the EVM measurements for subcarriers 320-2-320-5 as these subcarriers have the four largest EVM measurements. The control unit 211 may use the subcarriers 320-2-320-5 to calculate the frequency and the magnitude of the discrete interferer. For example, the control unit 211 may measure the EVM measurements of 2.45% for subcarrier 320-2, 8.11% for subcarrier 320-3, 6.2% for subcarrier 320-4, and 2.24% for subcarrier 320-5.

When calculating the frequency of the discrete interferer, the control unit 211 may identify the two highest EVM measurements to identify the frequency of the discrete interferer. For example, the control unit 211 may identify the subcarriers 320-3 and 320-4 as having the highest EVM measurements. With the highest two EVM measurements, the control unit 211 may calculate the ratio of the EVM measurement of the subcarrier with the lower frequency to the EVM measurement of the subcarrier with the higher frequency. Thus, the control unit 211 may calculate the ratio as the EVM measurement for the subcarrier 320-3 divided by the EVM measurement for the subcarrier 320-4. When the control unit 211 has calculated the ratio, the control unit 211 may identify the frequency offset from the lower subcarrier 320-3. In some implementations, the control unit 211 may calculate the frequency offset. However, the control unit 211 may look up the offset by looking up the ratio in a look-up table, such as the LUT 212. Thus, the control unit 211 may identify the frequency of the discrete interferer. For example, from the previously provided measurements, the control unit 211 may determine that the discrete interferer is 6.5 kHz above the lower subcarrier 320-3.

Additionally, the control unit 211 may also calculate the EVM magnitude of the discrete interferer from the gathered EVM measurements. For example, the control unit 211 may calculate the quadratic addition with subsequent root formation using the identified EVM measurements. For example, using the EVM measurements for subcarriers 320-2-320-5, the control unit 211 may identify the magnitude of the discrete interferer positioned 6.5 kHz above the subcarrier 320-3 as 10.72% of the magnitude of the amplitude of the subcarrier. Using the frequency and the magnitude, the control unit 211 may mitigate the effects of the discrete interferer.

FIG. 3C illustrates a graph 300*c*, where multiple subcarriers are affected by a discrete interferer. In particular, the graph 300*c* shows EVM measurements for the group of subcarriers 330-1-330-5. As shown, each subcarrier 330-1-330-5 has a non-zero EVM measurement. For example, the control unit 211 may measure the EVM measurements of 1.87% for subcarrier 330-1, 4.66% for subcarrier 320-2, 9.32% for subcarrier 320-3, and 2.33% for subcarrier 330-4. The control unit 211 may calculate the ratio as the EVM measurement for the subcarrier 330-2 divided by the EVM measurement for the subcarrier 330-3. When the control unit 211 has calculated the ratio, the control unit 211 may identify the frequency offset from the lower subcarrier 330-2 as being located 10 kHz above the lower subcarrier 330-2. Additionally, the control unit 211 may also calculate the magnitude of the amplitude of the discrete interferer from the gathered EVM measurements as being 10.81% of the magnitude of the amplitude of the subcarrier. Using the frequency and the magnitude, the control unit 211 may mitigate the effects of the discrete interferer.

Figure 4:
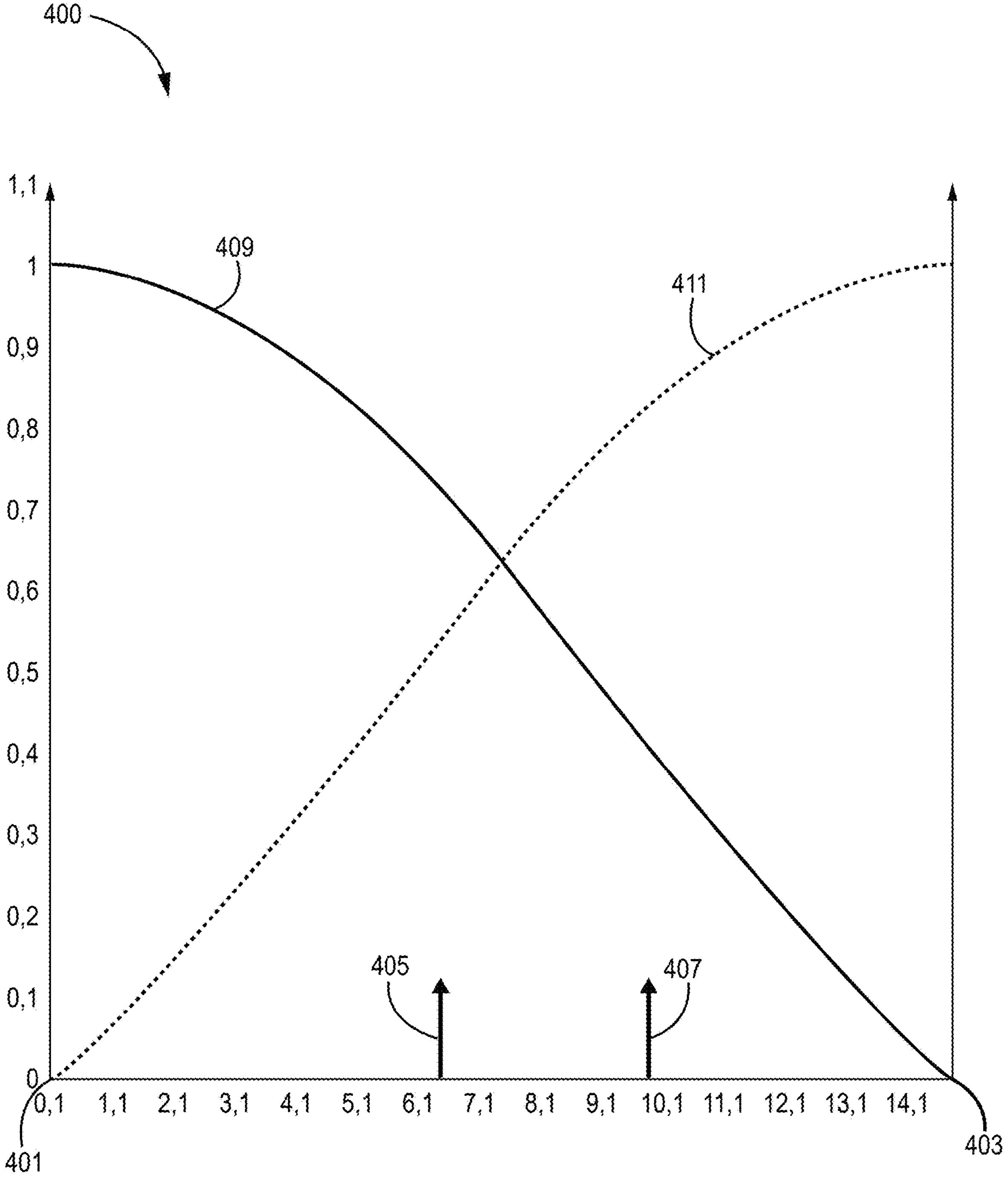
FIG. 4 is a graph illustrating the effects of discrete interferers on neighboring subcarriers according to an aspect of the present disclosure.

FIG. 4 is a graph 400 illustrating the effect of a discrete interferer based on the frequency offset from both a lower subcarrier frequency 401 and an upper subcarrier frequency 403. Further, the graph 400 illustrates a lower normalized EVM curve 409 associated with the lower subcarrier frequency 401 and an upper normalized EVM curve 411 associated with the upper subcarrier frequency 403. As the lower subcarrier with frequency 401 and the upper subcarrier with frequency 403 are orthogonal, the lower normalized EVM curve 409 has a value of zero at the upper subcarrier frequency 403, and the upper normalized EVM curve 411 has a value of zero at the lower subcarrier frequency 401. When a discrete interferer is located between the lower subcarrier frequency 401 and the upper subcarrier frequency 403, the discrete interferer affects the EVM of the neighboring subcarriers according to the normalized EVM curves 409, 411 respectively.

In some exemplary embodiments, a discrete interferer 405 may exist between the upper subcarrier frequency 403 and the lower subcarrier frequency 401. As shown, the frequency of the discrete interferer 405 may be slightly closer to the lower subcarrier frequency 401 than to the upper subcarrier frequency 403. Accordingly, the discrete interferer 405 may affect the lower subcarrier with the frequency 401 slightly more than the higher subcarrier with the frequency 403. Thus, the ratio $EVM_{lower}/EVM_{upper}$ will be slightly more than one. Alternatively, a different discrete interferer 407 may exist between the upper subcarrier frequency 403 and the lower subcarrier frequency 401. As shown, the frequency of the discrete interferer 407 may be significantly closer to the upper subcarrier frequency 403 than to the lower subcarrier frequency 401. Accordingly, the discrete interferer 407 may affect the EVM of the upper subcarrier with the frequency 403 slightly more than the EVM of the lower subcarrier with the frequency 401. Thus, the ratio $EVM_{lower}/EVM_{upper}$ will be less than one.

In certain embodiments, the ratio $EVM_{lower}/EVM_{upper}$ can be associated with a frequency offset based on the subcarrier spacing between the lower subcarrier frequency 401 and the upper subcarrier frequency 403. To facilitate the calculation of the offset frequency based on the ratio $EVM_{lower}/EVM_{upper}$, the control unit 211 may identify the offset frequency in the LUT 212 as described above. For example, the LUT 212 may associate offset frequencies with ratio values for a subcarrier spacing of 15 kHz, as shown in the following table:

| $f_{offset}$ (offset from lower subcarrier) | $EVM_{lower}/EVM_{upper}$ |
|---|---|
| 0.1 | 149 |
| 0.2 | 74 |
| 0.3 | 49 |
| 0.4 | 36.5 |
| 0.5 | 29 |
| . | . |
| . | . |
| . | . |
| . | . |
| . | . |
| 6.3 | 1.38095238 |
| 6.4 | 1.34375 |
| 6.5 | 1.30769231 |
| 6.6 | 1.27272727 |
| 6.7 | 1.23880597 |
| . | . |
| . | . |
| . | . |
| . | . |
| . | . |
| 8.3 | 0.80722892 |
| 8.4 | 0.78571429 |
| 8.5 | 0.76470588 |
| 8.6 | 0.74418605 |
| 8.7 | 0.72413793 |
| . | . |
| . | . |
| . | . |
| . | . |
| . | . |
| 14.6 | 0.02739716 |
| 14.7 | 0.02040816 |
| 14.8 | 0.01351351 |
| 14.9 | 0.00671141 |
| 15 | 1.8036E−16 |

Thus, a control unit 211 may quickly identify the offset frequency for a discrete interferer.

Figure 5:
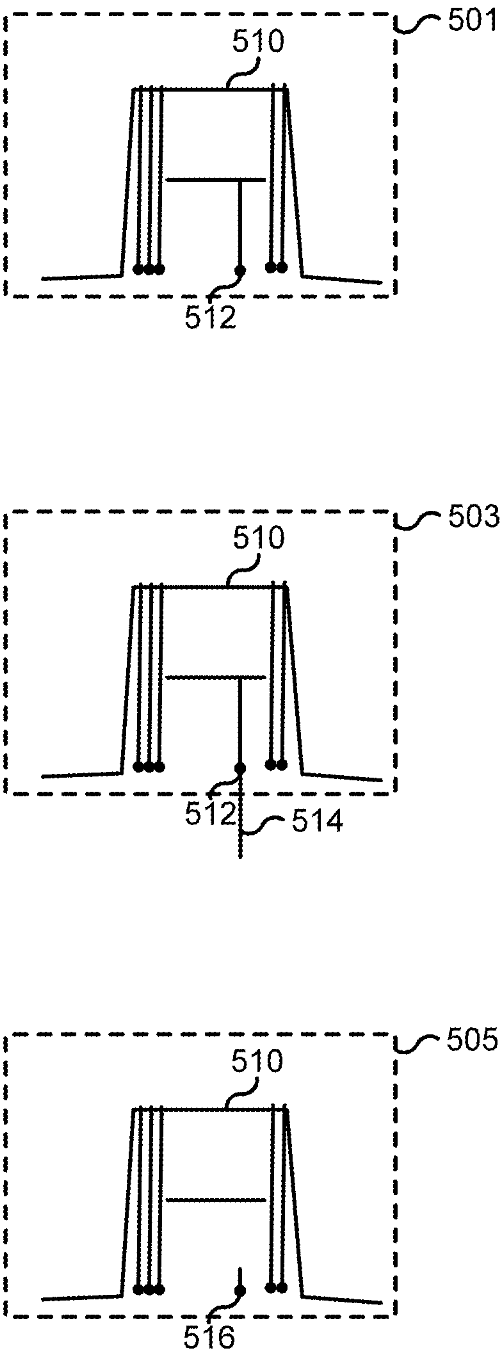
FIG. 5 shows a series of graphs illustrating the suppression of a discrete interferer with a continuous wave signal according to an aspect of the present disclosure.

FIG. 5 is a diagram of several graphs illustrating the removal of a discrete interferer 512 affecting subcarriers within a communication band 510. As illustrated in graph 501, some of the subcarriers within a communication band 510 may be affected by a discrete interferer 512. As described above, a control unit 211 may identify the frequency and magnitude of the discrete interferer 512. The control unit 211 may then provide a control signal to a signal generator to generate a CW signal (analog or digital) that can be added to reduce the effects of the discrete interferer. As illustrated within a graph 503, a CW signal 514 may be added at the frequency of the discrete interferer 512, where the addition of the CW signal 514 has the effect of subtracting the magnitude of the CW signal 514 from the discrete interferer 512. As illustrated within a graph 505, after adding the CW signal 514 to the discrete interferer 512, a mitigated discrete interferer 516 may be left at the frequency of the discrete interferer. However, the mitigated discrete interferer 516 has a significantly lower magnitude than the original discrete interferer 512. Thus, adding the CW signal 514 mitigates the negative effects of the discrete interferer in the presence of a wanted signal.

Figure 6:
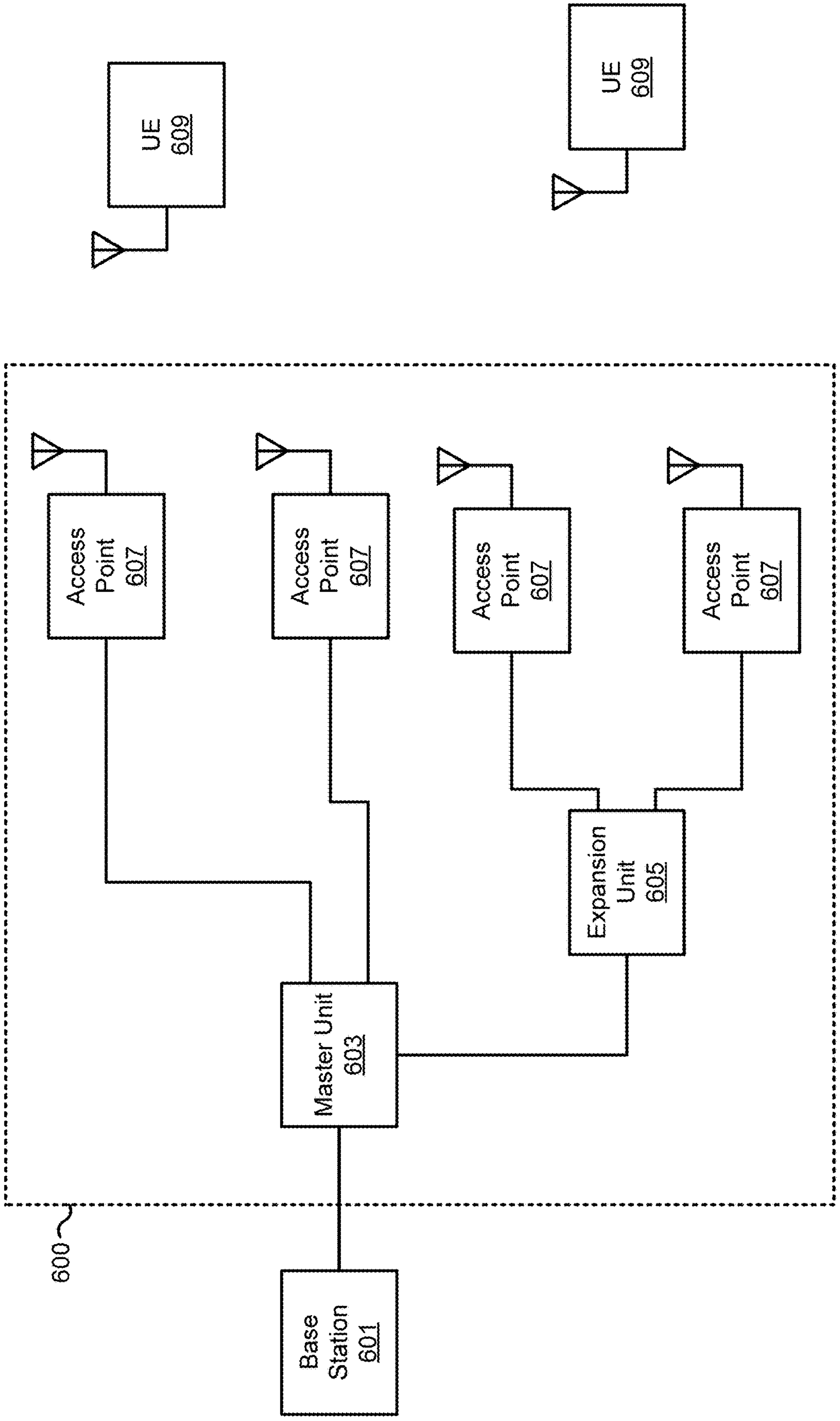
FIG. 6 is a block diagram of a distributed antenna system implementing EVM-based suppression according to an aspect of the present disclosure.

FIG. 6 is a block diagram of a DAS 600 that implements EVM suppression as described herein. As illustrated, the DAS 600 includes one or more master units 603 (also referred to as central access nodes) that are communicatively coupled to a plurality of remotely located access points 607 or antenna units (also referred to as "remote units" or "radio units"). Each access point 607 may be coupled directly to the one or more master units 603. Also, each access point 607 can be coupled indirectly via one or more other remote units or via one or more intermediary or expansion units 605 or nodes (also referred to as "transport expansion nodes (TENs)"). A DAS is typically used to improve the coverage provided by one or more base stations 601 coupled to the master unit 603. These base stations 601 can be coupled to the one or more master units 603 via one or more cables or a wireless connection, for example, using one or more donor antennas. The wireless service provided by the base station 601 can include commercial cellular service or private or public safety wireless communications.

In general, each master unit 603 receives one or more downlink signals from the one or more base stations 601 and generates one or more downlink transport signals derived from one or more of the received downlink base station signals. Each master unit 603 transmits one or more downlink transport signals to one or more access points 607. Each access point 607 receives the downlink transport signals transmitted to it from the one or more master units 603 and uses the received downlink transport signals to generate one or more downlink radio frequency signals for radiation from one or more coverage antennas associated with that access point 607. The downlink radio frequency signals are radiated for reception by user equipment (UEs) 609. Typically, the downlink radio frequency signals associated with each base station 601 are simulcasted from multiple access points 607. In this way, the DAS 600 increases the coverage area for the downlink capacity provided by the base station 601.

Likewise, each access point 607 receives one or more uplink radio frequency signals transmitted from the user equipment 609. Each access point 607 generates one or more uplink transport signals derived from the one or more uplink radio frequency signals and transmits the one or more uplink transport signals to one or more of the master units 603. Each master unit 603 receives the respective uplink transport signals transmitted to it from one or more access points 607 and uses the received uplink transport signals to generate one or more uplink base station radio frequency signals that are provided to the one or more base stations 601 associated with that master unit 603. Typically, receiving the uplink signals involves, among other things, summing uplink signals received from the multiple access points 607 to produce the base station signal provided to each base station 601. In this way, the DAS 600 increases the coverage area for the uplink capacity provided by the base station 601.

In some embodiments, the base station 601 may provide digital/analog signals affected by discrete interferers. Further, subsequent processing by the components of the DAS 600 may also introduce discrete interferers into communication signals. To mitigate the effects of the discrete interferers, components of the DAS 600 may implement the EVM suppression described above. In particular, the master unit 603, expansion unit 605, and access points 607 may each be capable of implementing EVM suppression as described above. By implementing the EVM suppression in one or more components of the DAS 600, the DAS 600 can mitigate discrete interferers in the presence of a wanted signal.

Figure 7:
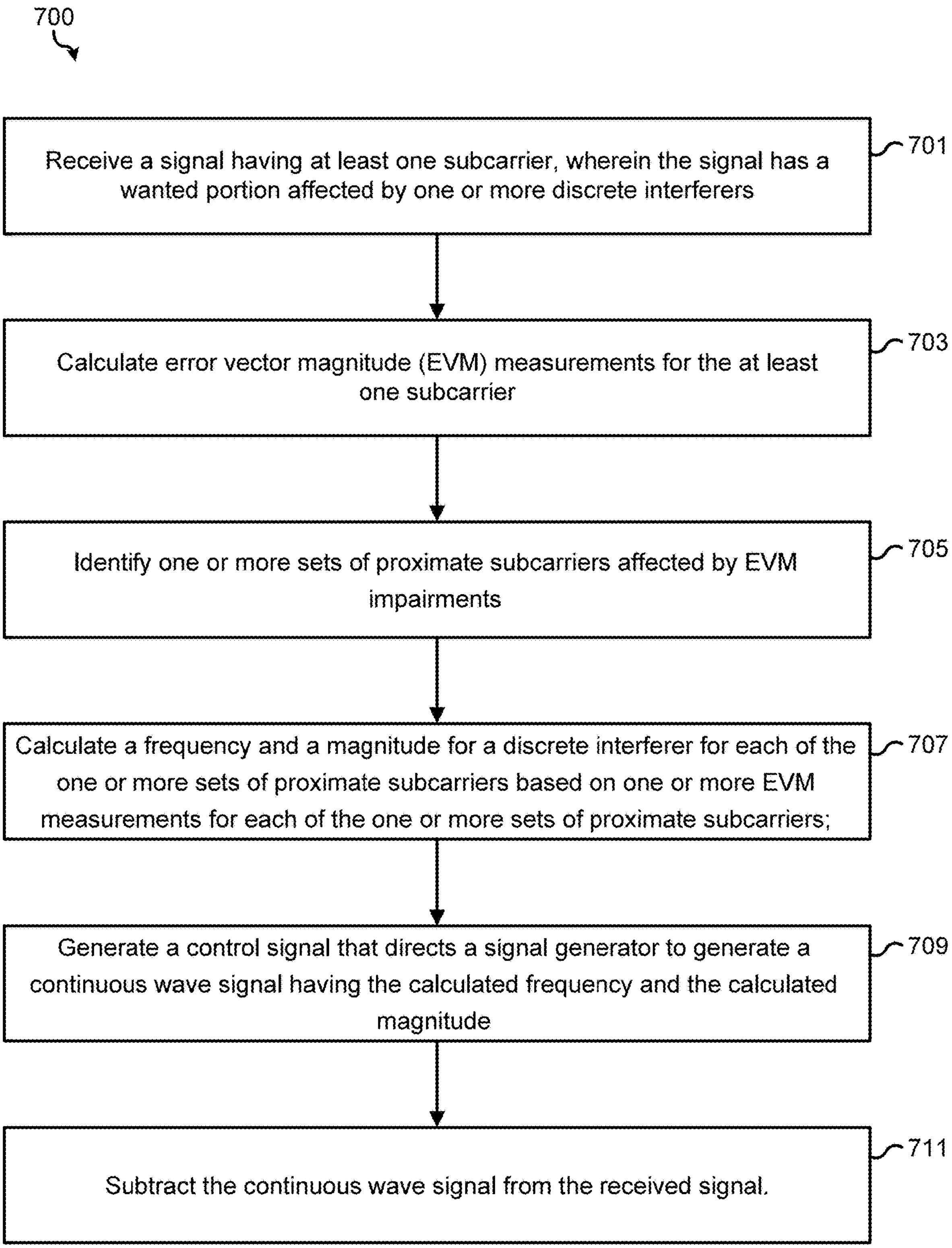
FIG. 7 is a flowchart diagram of a method for performing EVM-based suppression of discrete interferers according to an aspect of the present disclosure.

FIG. 7 is a flowchart diagram of a method 700 for performing EVM-based suppression of discrete interferers. For example, the method 700 proceeds at 701, where a signal having at least one subcarrier is received, wherein the signal has a wanted portion affected by one or more discrete interferers. Further, the method 700 proceeds at 703, where EVM measurements are calculated for the at least one subcarrier. Also, the method 700 proceeds at 705, where one or more sets of proximate subcarriers affected by EVM impairments are identified.

Additionally, the method 700 proceeds at 707, where a frequency and magnitude for a discrete interferer are calculated for each of the one or more sets of proximate subcarriers based on one or more EVM measurements for each of the one or more sets of proximate subcarriers. Moreover, the method 700 proceeds at 709, where a control signal is generated that directs a signal generator to generate a continuous wave signal having the calculated frequency and the calculated magnitude. Further, the method 700 proceeds at 711, where the continuous wave signal is subtracted from the received signal.

EXAMPLE EMBODIMENTS

Example 1 includes a system comprising: a control unit configured to receive a signal having a plurality of subcarriers, wherein the signal has a wanted portion affected by one or more discrete interferers, wherein the control unit is further configured to: calculate error vector magnitude (EVM) measurements for multiple subcarriers in the plurality of subcarriers; identify one or more sets of proximate subcarriers affected by EVM impairments; calculate a frequency and a magnitude for a discrete interferer for each of the one or more sets of proximate subcarriers based on one or more EVM measurements for each of the one or more sets of proximate subcarriers; and for each calculated frequency and each magnitude, generate a control signal that can be used to reduce effects of the discrete interferer associated with the calculated frequency and the calculated magnitude.

Example 2 includes the system of Example 1, further comprising a continuous wave signal generator configured to receive the control signal, wherein the continuous wave signal generator generates a continuous wave signal having the calculated frequency and the calculated magnitude.

Example 3 includes the system of Example 2, wherein the continuous wave signal generator generates the continuous wave signal in at least one of the analog domain and the digital domain.

Example 4 includes the system of any of Examples 1-3, wherein the control unit receives the signal in the digital domain.

Example 5 includes the system of any of Examples 1-4, further comprising an analog-to-digital converter configured to receive the signal in the analog domain and convert the signal into the digital domain before reception by the control unit.

Example 6 includes the system of any of Examples 1-5, wherein the control unit is further configured to receive a feedback signal representing the signal with a reduced discrete interferer, wherein the control unit adjusts a phase associated with the discrete interferer in the control signal.

Example 7 includes the system of any of Examples 1-6, wherein the control unit is configured to determine the calculated frequency for the discrete interferer by determining whether a set in the one or more sets of proximate subcarriers comprise more than one subcarrier affected by the EVM impairments; wherein when the set comprises one subcarrier affected by an EVM impairment, the control unit determines the calculated frequency for the discrete interferer to be the frequency of the one subcarrier and the magnitude of the discrete interferer to be proportional to the EVM measurement; wherein when the set comprises more than one subcarrier affected by the EVM impairment, the control unit is configured to: identify two proximate subcarriers in the set associated with the EVM measurement with a greatest magnitude; calculate a ratio of the EVM measurements for a lower subcarrier frequency in the two proximate subcarriers and an upper subcarrier frequency in the two proximate subcarriers; and determine an offset frequency from the lower subcarrier frequency based on the ratio.

Example 8 includes the system of Example 7, wherein the control unit is configured to determine the offset frequency by identifying the offset frequency associated with the ratio in a look-up table.

Example 9 includes the system of any of Examples 1-8, wherein the control unit is configured to calculate the magnitude for the discrete interferer using quadratic addition with subsequent root formation with the EVM measurements for the set of proximate subcarriers.

Example 10 includes a method comprising: receiving a signal having at least one subcarrier, wherein the signal has a wanted portion affected by one or more discrete interferers; calculating error vector magnitude (EVM) measurements for the at least one subcarrier; identifying one or more sets of proximate subcarriers affected by EVM impairments; calculating a frequency and a magnitude for a discrete interferer for each of the one or more sets of proximate subcarriers based on one or more EVM measurements for each of the one or more sets of proximate subcarriers; generating a control signal that directs a signal generator to generate a continuous wave signal having the calculated frequency and the calculated magnitude; and subtracting the continuous wave signal from the received signal.

Example 11 includes the method of Example 10, wherein the signal generator generates the continuous wave signal in at least one of the analog domain and the digital domain.

Example 12 includes the method of any of Examples 10-11, wherein receiving the signal further comprises receiving an analog signal and converting the analog signal into a digital signal before calculating the EVM measurements.

Example 13 includes the method of any of Examples 10-12, further comprising: receiving a feedback signal representing the signal after subtracting the continuous wave signal from the received signal; and adjusting a phase associated with the continuous wave signal.

Example 14 includes the method of any of Examples 10-13, wherein calculating the frequency further comprises: determining whether a set in the one or more sets of proximate subcarriers comprises more than one subcarrier affected by the EVM impairments; when the set comprises one subcarrier affected by an EVM impairment, determining the calculated frequency for the discrete interferer to be the frequency of the one subcarrier and the magnitude of the amplitude of the discrete interferer to be proportional to the EVM measurement; and when the set comprises more than one subcarrier affected by the EVM impairments: identifying two proximate subcarriers in the set associated with the EVM measurements with a greatest magnitude; calculating a ratio of the EVM measurements for a lower subcarrier frequency in the two proximate subcarriers and an upper subcarrier frequency in the two proximate subcarriers; and determining an offset frequency from the lower subcarrier frequency based on the ratio.

Example 15 includes the method of Example 14, wherein determining the offset frequency further comprises identifying the offset frequency associated with the ratio in a look-up table.

Example 16 includes the method of any of Examples 10-15, wherein calculating the magnitude for the discrete interferer comprises using quadratic addition with subsequent root formation with the EVM measurements for the set of proximate subcarriers.

Example 17 includes a system comprising: a control unit configured to receive a signal having a plurality of subcarriers, wherein the signal has a wanted portion affected by one or more discrete interferers, wherein the control unit is further configured to: calculate error vector magnitude (EVM) measurements for multiple subcarriers in the plurality of subcarriers; identify one or more sets of proximate subcarriers affected by EVM impairments; calculate a frequency and a magnitude for a discrete interferer for each of the one or more sets of proximate subcarriers based on one or more EVM measurements for each of the one or more sets of proximate subcarriers; and for each calculated frequency and each calculated magnitude, generate a control signal that can be used to reduce the effects of the discrete interferer associated with the calculated frequency and the calculated magnitude; a continuous wave signal generator configured to receive the control signal, wherein the continuous wave signal generator generates a continuous wave signal having the calculated frequency and the calculated magnitude; and a summer configured to subtract the continuous wave signal from the received signal to create a modified signal; wherein the control unit is further configured to receive the modified signal and adjust a phase associated with the discrete interferer in the control signal.

Example 18 includes the system of Example 17, wherein the control unit is configured to determine the calculated frequency for the discrete interferer by determining whether a set in the one or more sets of proximate subcarriers comprises more than one subcarrier affected by the EVM impairments; wherein when the set comprises one subcarrier affected by an EVM impairment, the control unit determines the calculated frequency for the discrete interferer to be the frequency of the one subcarrier and the magnitude of the discrete interferer to be proportional to the EVM measurement; wherein when the set comprises more than one subcarrier affected by the EVM impairments, the control unit is configured to: identify two proximate subcarriers in the set associated with the EVM measurements with a greatest magnitude; calculate a ratio of the EVM measurements for a lower subcarrier frequency in the two proximate subcarriers and an upper subcarrier frequency in the two proximate subcarriers; and determine an offset frequency from the lower subcarrier frequency based on the ratio.

Example 19 includes the system of Example 18, wherein the control unit is configured to determine the offset frequency by identifying the offset frequency associated with the ratio in a look-up table.

Example 20 includes the system of any of Examples 17-19, wherein the control unit is configured to calculate the magnitude for the discrete interferer using quadratic addition with subsequent root formation with the EVM measurements for the set of proximate subcarriers.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:

a control unit configured to receive a signal having a plurality of subcarriers, wherein the signal has a wanted portion affected by one or more discrete interferers, wherein the control unit is further configured to:

calculate error vector magnitude (EVM) measurements for multiple subcarriers in the plurality of subcarriers;

identify one or more sets of proximate subcarriers affected by EVM impairments;

calculate a frequency and a magnitude for a discrete interferer for each of the one or more sets of proximate subcarriers based on one or more EVM measurements for each of the one or more sets of proximate subcarriers; and for each calculated frequency and each magnitude, generate a control signal that can be used to reduce effects of the discrete interferer associated with the calculated frequency and the calculated magnitude.

2. The system of claim 1, further comprising a continuous wave signal generator configured to receive the control signal, wherein the continuous wave signal generator generates a continuous wave signal having the calculated frequency and the calculated magnitude.

3. The system of claim 2, wherein the continuous wave signal generator generates the continuous wave signal in at least one of the analog domain and the digital domain.

4. The system of claim 1, wherein the control unit receives the signal in the digital domain.

5. The system of claim 1, further comprising an analog-to-digital converter configured to receive the signal in the analog domain and convert the signal into the digital domain before reception by the control unit.

6. The system of claim 1, wherein the control unit is further configured to receive a feedback signal representing the signal with a reduced discrete interferer, wherein the control unit adjusts a phase associated with the discrete interferer in the control signal.

7. The system of claim 1, wherein the control unit is configured to determine the calculated frequency for the discrete interferer by determining whether a set in the one or more sets of proximate subcarriers comprises more than one subcarrier affected by the EVM impairments;

wherein when the set comprises one subcarrier affected by an EVM impairment, the control unit determines the calculated frequency for the discrete interferer to be the frequency of the one subcarrier and the magnitude of the discrete interferer to be proportional to the EVM measurement;

wherein when the set comprises more than one subcarrier affected by the EVM impairment, the control unit is configured to:

identify two proximate subcarriers in the set associated with the EVM measurements with a greatest magnitude;

calculate a ratio of the EVM measurements for a lower subcarrier frequency in the two proximate subcarriers and an upper subcarrier frequency in the two proximate subcarriers; and determine an offset frequency from the lower subcarrier frequency based on the ratio.

8. The system of claim 7, wherein the control unit is configured to determine the offset frequency by identifying the offset frequency associated with the ratio in a look-up table.

9. The system of claim 1, wherein the control unit is configured to calculate the magnitude for the discrete interferer using quadratic addition with subsequent root formation with the EVM measurements for the set of proximate subcarriers.

10. A method comprising:

receiving a signal having at least one subcarrier, wherein the signal has a wanted portion affected by one or more discrete interferers;

calculating error vector magnitude (EVM) measurements for the at least one subcarrier;

identifying one or more sets of proximate subcarriers affected by EVM impairments;

calculating a frequency and a magnitude for a discrete interferer for each of the one or more sets of proximate subcarriers based on one or more EVM measurements for each of the one or more sets of proximate subcarriers;

generating a control signal that directs a signal generator to generate a continuous wave signal having the calculated frequency and the calculated magnitude; and subtracting the continuous wave signal from the received signal.

11. The method of claim 10, wherein the signal generator generates the continuous wave signal in at least one of the analog domain and the digital domain.

12. The method of claim 10, wherein receiving the signal further comprises receiving an analog signal and converting the analog signal into a digital signal before calculating the EVM measurements.

13. The method of claim 10, further comprising:

receiving a feedback signal representing the signal after subtracting the continuous wave signal from the received signal; and adjusting a phase associated with the continuous wave signal.

14. The method of claim 10, wherein calculating the frequency further comprises:

determining whether a set in the one or more sets of proximate subcarriers comprise more than one subcarrier affected by the EVM impairments;

when the set comprises one subcarrier affected by an EVM impairment, determining the calculated frequency for the discrete interferer to be the frequency of the one subcarrier and the magnitude of the amplitude of the discrete interferer to be proportional to the EVM measurement; and when the set comprises more than one subcarrier affected by the EVM impairments:

identifying two proximate subcarriers in the set associated with the EVM measurements with a greatest magnitude;

calculating a ratio of the EVM measurements for a lower subcarrier frequency in the two proximate subcarriers and an upper subcarrier frequency in the two proximate subcarriers; and determining an offset frequency from the lower subcarrier frequency based on the ratio.

15. The method of claim 14, wherein determining the offset frequency further comprises identifying the offset frequency associated with the ratio in a look-up table.

16. The method of claim 10, wherein calculating the magnitude for the discrete interferer comprises using quadratic addition with subsequent root formation with the EVM measurements for the set of proximate subcarriers.

17. A system comprising:

a control unit configured to receive a signal having a plurality of subcarriers, wherein the signal has a wanted portion affected by one or more discrete interferers, wherein the control unit is further configured to:

calculate error vector magnitude (EVM) measurements for multiple subcarriers in the plurality of subcarriers;

identify one or more sets of proximate subcarriers affected by EVM impairments;

calculate a frequency and a magnitude for a discrete interferer for each of the one or more sets of proximate subcarriers based on one or more EVM measurements for each of the one or more sets of proximate subcarriers; and for each calculated frequency and each calculated magnitude, generate a control signal that can be used to reduce the effects of the discrete interferer associated with the calculated frequency and the calculated magnitude;

a continuous wave signal generator configured to receive the control signal, wherein the continuous wave signal generator generates a continuous wave signal having the calculated frequency and the calculated magnitude; and a summer configured to subtract the continuous wave signal from the received signal to create a modified signal;

wherein the control unit is further configured to receive the modified signal and adjust a phase associated with the discrete interferer in the control signal.

18. The system of claim 17, wherein the control unit is configured to determine the calculated frequency for the discrete interferer by determining whether a set in the one or more sets of proximate subcarriers comprises more than one subcarrier affected by the EVM impairments;

wherein when the set comprises one subcarrier affected by an EVM impairment, the control unit determines the calculated frequency for the discrete interferer to be the frequency of the one subcarrier and the magnitude of the discrete interferer to be proportional to the EVM measurement;

wherein when the set comprises more than one subcarrier affected by the EVM impairments, the control unit is configured to:

identify two proximate subcarriers in the set associated with the EVM measurements with a greatest magnitude;

calculate a ratio of the EVM measurements for a lower subcarrier frequency in the two proximate subcarriers and an upper subcarrier frequency in the two proximate subcarriers; and determine an offset frequency from the lower subcarrier frequency based on the ratio.

19. The system of claim 18, wherein the control unit is configured to determine the offset frequency by identifying the offset frequency associated with the ratio in a look-up table.

20. The system of claim 17, wherein the control unit is configured to calculate the magnitude for the discrete interferer using quadratic addition with subsequent root formation with the EVM measurements for the set of proximate subcarriers.

* * * * *